United States Patent
Wang et al.

(10) Patent No.: US 12,536,471 B2
(45) Date of Patent: Jan. 27, 2026

(54) METHOD AND APPARATUS FOR TRAINING CLASSIFIER

(71) Applicant: HUAWEI TECHNOLOGIES CO., LTD., Guangdong (CN)

(72) Inventors: Shuo Wang, Shenzhen (CN); Jun Yue, Shenzhen (CN); Jianzhuang Liu, Shenzhen (CN); Qi Tian, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 750 days.

(21) Appl. No.: 17/892,908

(22) Filed: Aug. 22, 2022

(65) Prior Publication Data
US 2023/0177390 A1   Jun. 8, 2023

Related U.S. Application Data

(63) Continuation of application No. PCT/CN2020/117613, filed on Sep. 25, 2020.

(30) Foreign Application Priority Data

Feb. 23, 2020  (CN) .......................... 202010109899.6

(51) Int. Cl.
*G06N 20/00* (2019.01)
(52) U.S. Cl.
CPC .................................. *G06N 20/00* (2019.01)
(58) Field of Classification Search
CPC .......... G06N 20/00; G06N 3/04; G06N 3/096; G06N 3/045; G06N 3/08; G06V 10/806; G06V 20/00; G06V 10/82; G06V 10/40; G06F 18/22; G06F 18/241; G06F 18/214
See application file for complete search history.

(56) References Cited

U.S. PATENT DOCUMENTS

2018/0225548 A1   8/2018   Cao et al.

FOREIGN PATENT DOCUMENTS

| AU | 2020100052 A4 | 2/2020 |
|---|---|---|
| CN | 108053030 A | 5/2018 |

(Continued)

OTHER PUBLICATIONS

Zhang et al., "Multi-Label Transfer Learning for Semantic Similarity," Submitted on May 31, 2018, arXiv:1805.12501v1, 6 pages.

(Continued)

*Primary Examiner* — Pei Yong Weng
(74) *Attorney, Agent, or Firm* — Fish & Richardson P.C.

(57) ABSTRACT

This application relates to Artificial intelligence and provides a method for training a classifier, one example method including: obtaining a first training sample, where the first training sample includes a corresponding semantic tag; obtaining a plurality of second training samples, where each of the second training samples includes a corresponding semantic tag; determining a target sample from the plurality of second training samples based on semantic similarities between the first training sample and the plurality of second training samples; and training the classifier based on the first training sample, the target sample, and a semantic similarity between the first training sample and the target sample.

20 Claims, 4 Drawing Sheets

(56) References Cited

FOREIGN PATENT DOCUMENTS

| CN | 108510004 | A |   | 9/2018  |             |
|----|-----------|---|---|---------|-------------|
| CN | 108805803 | A |   | 11/2018 |             |
| CN | 110073367 | A |   | 7/2019  |             |
| CN | 110309875 | A | * | 10/2019 | ........... G06F 18/241 |
| CN | 110378408 | A | * | 10/2019 | ............... G06N 3/08 |
| CN | 111382782 | A |   | 7/2020  |             |

OTHER PUBLICATIONS

Zhang et al., "Few-shot Learning via Saliency-guided Hallucination of Samples," Submitted on Apr. 6, 2019, arXiv:1904.03472v1, 11 pages.
Li et al., "Large-Scale Few-Shot Learning: Knowledge Transfer With Class Hierarchy," 2019 IEEE/CVF Conference on Computer Vision and Pattern Recognition (CVPR), Jun. 15-20, 2019, 9 pages.
Ji et al., "A decadal survey of zero-shot image classification," Scientia Sinica Informationis, vol. 49, No. 10, Mar. 5, 2019, 22 pages (with English Abstract).
Office Action in Chinese Appln. No. 202010109899.6, dated Mar. 27, 2023, 12 pages.
International Search Report and Written Opinion in International Appln. No. PCT/CN2020/117613, mailed on Dec. 31, 2020, 17 pages (with English translation).
Lucas et al., "Semantic and Visual Similarities for Efficient Knowledge Transfer in CNN Training," Proceedings of 2019 International Conference on Content-Based Multimedia Indexing (CBMI), Sep. 4, 2019, pp. 1-6.
Extended European Search Report in European Appln No. 20919863.9, dated Jul. 18, 2023, 7 pages.

* cited by examiner

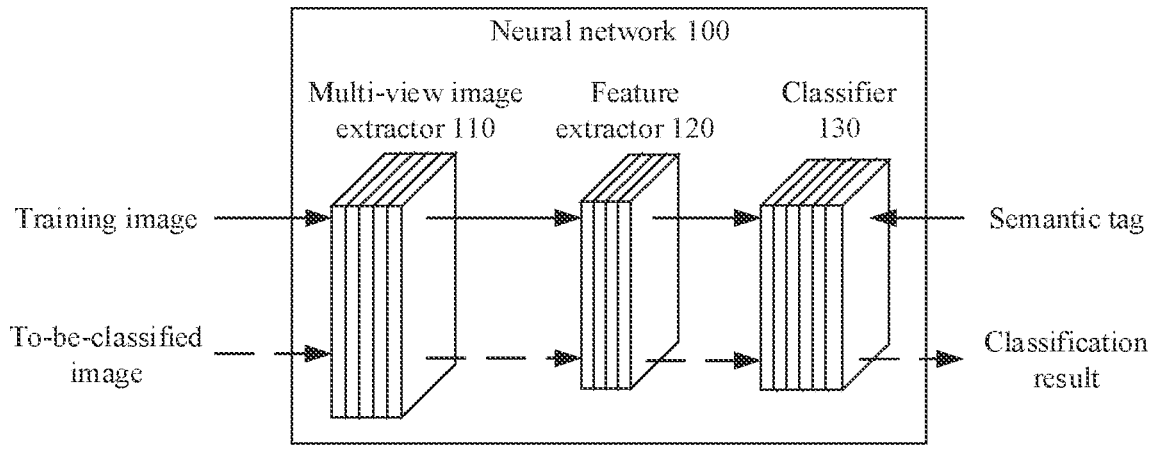

Obtain a first training sample, where the first training sample includes a corresponding semantic tag — S210

Obtain a plurality of second training samples, where each of the second training samples includes a corresponding semantic tag — S220

Determine a target sample from the plurality of second training samples based on semantic similarities between the first training sample and the plurality of second training samples — S230

Train a classifier based on the first training sample, the target sample, and a semantic similarity between the first training sample and the target sample — S240

FIG. 2

METHOD AND APPARATUS FOR TRAINING CLASSIFIER

CROSS-REFERENCE TO RELATED APPLICATIONS

This application is a continuation of International Application No. PCT/CN2020/117613, filed on Sep. 25, 2020, which claims priority to Chinese Patent Application No. 202010109899.6, filed on Feb. 23, 2020. The disclosures of the aforementioned applications are hereby incorporated by reference in their entireties.

TECHNICAL FIELD

This application relates to the field of artificial intelligence, and in particular, to a method and an apparatus for training a classifier.

BACKGROUND

A neural network is a tool for implementing artificial intelligence. Before being applied, the neural network needs to be trained by using a large quantity of samples, to implement a specific function. When the neural network is required to implement a new function, the neural network usually needs to be trained by using a large quantity of novel samples.

A method to reduce a workload of re-training the neural network is knowledge transfer. The neural network learns knowledge after being trained based on a large quantity of samples. When a novel (novel) sample is used to train the neural network, the learned knowledge may be used to process the novel sample. In this way, re-training of the neural network may be completed with fewer novel samples, thereby improving performance of the neural network. Compared with the novel samples, the large quantity of samples may be referred to as base (base) samples.

When the neural network is trained by using knowledge transfer and a novel sample, a feature extractor is usually used to extract a feature from the novel sample, and perform processing such as classification on the novel sample based on the feature. When a category of the novel sample changes, the feature extractor needs to re-learn a feature of the novel sample of a new category. As a result, a training workload increases.

SUMMARY

This application provides a method and an apparatus for training a classifier, to improve training efficiency and performance of a classifier.

According to a first aspect, a method for training a classifier is provided, including: obtaining a first training sample, where the first training sample includes a corresponding semantic tag; obtaining a plurality of second training samples, where each of the second training samples includes a corresponding semantic tag; determining a target sample from the plurality of second training samples based on semantic similarities between the first training sample and the plurality of second training samples; and training the classifier based on the first training sample, the target sample, and a semantic similarity between the first training sample and the target sample.

The semantic similarity is used to measure a difficulty level of knowledge transfer. For example, a semantic similarity between a tabby cat and a tiger cat is high, indicating that a feature similarity between a tabby cat image and a tiger cat image is high. Classification knowledge learned by the classifier from a feature of the tiger cat image is more easily transferred to a classification process of the tabby cat image, and more tiger cat images may be used to train the classifier. A semantic similarity between the tabby cat and a coonhound is low, indicating that a feature similarity between the tabby cat image and a coonhound image is low. Classification knowledge learned by the classifier from a feature of the coonhound image is difficult to transfer to the classification process of the tabby cat image, and a quantity of coonhound images used in a training process of the classifier may be reduced. Therefore, training efficiency and performance of the classifier can be improved by training the classifier based on the semantic similarity. In addition, during feature extraction in the foregoing method, a semantic tag is not used for learning. Therefore, a network structure of a feature extractor does not need to be changed, thereby improving training efficiency of a neural network (including the classifier).

Optionally, the training the classifier based on the first training sample, the target sample, and a semantic similarity between the first training sample and the target sample includes: determining a predicted score of the first training sample by using the classifier; determining a semantic transfer loss function $L_{semantic}$ of the classifier based on the predicted score and the semantic similarity between the first training sample and the target sample, where the semantic similarity between the target sample and the first training sample is used to determine an influence degree of the predicted score on $L_{semantic}$; and training the classifier based on $L_{semantic}$.

The performance of the classifier can be improved by training the classifier based on the semantic similarity.

Optionally, when the semantic similarity between the target sample and the first training sample is greater than or equal to a semantic transfer intensity, the influence degree of the predicted score on $L_{semantic}$ is 100%. Alternatively, when the semantic similarity between the target sample and the first training sample is less than the semantic transfer intensity, the influence degree of the predicted score on $L_{semantic}$ is 0.

The semantic transfer intensity may be set based on experience, so that the classifier learns correct classification knowledge and avoids being misled by wrong classification knowledge.

Optionally, the training the classifier based on the first training sample, the target sample, and a semantic similarity between the first training sample and the target sample includes: determining a predicted score $S^n$ of the first training sample by using the classifier; determining a predicted score $S^b$ of the target training sample by using the classifier; determining a balanced learning loss function $L_{IC}$ of the classifier based on $S^n$, $S^b$, and a balanced learning intensity, where the balanced learning intensity is used to adjust influence degrees of $S^n$ and $S^b$ on $L_{IC}$; and training the classifier based on $L_{IC}$.

In the training process of the classifier, a quantity of base samples is generally greater than a quantity of novel samples, and the classifier tends to predict the novel samples into categories of the base samples based on knowledge learned from the base samples, resulting in performance degradation of the classifier. The influence degrees of $S^n$ and $S^b$ on $L_{IC}$ are adjusted based on the balanced learning intensity, so that the classifier can focus more on learning classification knowledge of the novel samples, and a classifier with better performance is finally obtained.

Optionally, that the balanced learning intensity is used to adjust influence degrees of $S^n$ and $S^b$ on $L_{IC}$ includes: the balanced learning intensity is used to increase the influence degree of $S^n$ on $L_{IC}$, and decrease the influence degree of $S^b$ on $L_{IC}$.

The foregoing solution enables the classifier to focus on learning the classification knowledge of the novel samples, to increase a value of $S^n$ to reduce $L_{IC}$, so that a classifier with better performance is finally obtained.

Optionally, the training the classifier based on the first training sample, the target sample, and a semantic similarity between the first training sample and the target sample includes: obtaining multi-view features of the first training sample and the target sample; and training the classifier based on the multi-view features.

In the training process, the feature extractor may extract an image feature from an original image, and input the image feature into the classifier for training. Because a quantity of target samples is relatively large, when the feature extractor extracts an image feature of the first training sample after using the target samples to perform extraction and learning, the feature extractor tends to extract the feature from the first training sample based on learned knowledge, and ignores new content in the first training sample. For this reason, this application provides a feature extraction method to convert each sample into a multi-view image (for example, an original image, a foreground image, and a background image), and details of the multi-view image are richer. The feature extractor extracts an image feature from the multi-view image, so that the feature extractor can avoid ignoring the new content in the first training sample and extract a more accurate feature, thereby obtaining a classifier with better performance.

Optionally, the obtaining multi-view features of the first training sample and the target sample includes: separating a plurality of images from each sample in the first training sample and the target sample, where the plurality of images of each sample have different angles of view; obtaining a plurality of features of each sample based on the plurality of images of each sample; and splicing the plurality of features of each sample to obtain the multi-view features.

Optionally, the training the classifier based on the first training sample, the target sample, and a semantic similarity between the first training sample and the target sample includes: determining the predicted score of the first training sample by using the classifier; determining a classification loss function $L_{CE}$ of the classifier based on the predicted score; and training the classifier based on $L_{CE}$.

According to a second aspect, an image classification method is provided, including: obtaining a feature of a to-be-classified image; inputting the feature into a neural network for classification, where the neural network includes a classifier, the classifier is obtained through training based on a first training sample, a target sample corresponding to the first training sample, and a semantic similarity between the first training sample and the target sample, and the target sample is determined from a plurality of second training samples based on semantic similarities between the first training sample and the plurality of second training samples; and obtaining a classification result of the to-be-classified image.

Performance of the classifier can be improved by training the classifier based on the semantic similarity. Therefore, the classification result of the to-be-classified image obtained by using the classifier is more accurate.

Optionally, the feature of the to-be-classified image is a multi-view feature.

Details of a multi-view image are richer. A feature extractor extracts an image feature from the multi-view image, so that the feature extractor can avoid ignoring new content in the to-be-classified image and extract a more accurate feature, thereby obtaining a more accurate classification result.

Optionally, the obtaining a feature of a to-be-classified image includes: obtaining a plurality of images of different angles of view from the to-be-classified image; obtaining a feature of each image in the plurality of images of different angles of view; and splicing the feature of each image to obtain the multi-view feature of the to-be-classified image.

Optionally, that the classifier is obtained through training based on a first training sample, a target sample corresponding to the first training sample, and a semantic similarity between the first training sample and the target sample includes: determining a predicted score of the first training sample by using the classifier; determining a semantic transfer loss function $L_{semantic}$ of the classifier based on the predicted score and the semantic similarity between the first training sample and the target sample, where the semantic similarity between the target sample and the first training sample is used to determine an influence degree of the predicted score on $L_{semantic}$; and training the classifier based on $L_{semantic}$.

The performance of the classifier can be improved by training the classifier based on the semantic similarity.

Optionally, when the semantic similarity between the target sample and the first training sample is greater than or equal to a semantic transfer intensity, the influence degree of the predicted score on $L_{semantic}$ 100%. When the semantic similarity between the target sample and the first training sample is less than the semantic transfer intensity, the influence degree of the predicted score on $L_{semantic}$ is 0.

The semantic transfer intensity may be set based on experience, so that the classifier learns correct classification knowledge and avoids being misled by wrong classification knowledge.

Optionally, that the classifier is obtained through training based on a first training sample, a target sample corresponding to the first training sample, and a semantic similarity between the first training sample and the target sample includes: determining a predicted score $S^n$ of the first training sample by using the classifier; determining a predicted score $S^b$ of the target training sample by using the classifier; determining a balanced learning loss function $L_{IC}$ of the classifier based on $S^n$, $S^b$, and a balanced learning intensity, where the balanced learning intensity is used to adjust influence degrees of $S^n$ and $S^b$ on $L_{IC}$; and training the classifier based on $L_{IC}$.

In a training process of the classifier, a quantity of base samples is generally greater than a quantity of novel samples, and the classifier tends to predict the novel samples into categories of the base samples based on knowledge learned from the base samples, resulting in performance degradation of the classifier. The influence degrees of $S^n$ and $S^b$ on $L_{IC}$ are adjusted based on the balanced learning intensity, so that the classifier can focus more on learning classification knowledge of the novel samples, and a classifier with better performance is finally obtained.

Optionally, that the balanced learning intensity is used to adjust influence degrees of $S^n$ and $S^b$ on $L_{IC}$ includes: the balanced learning intensity is used to increase the influence degree of $S^n$ on $L_{IC}$, and decrease the influence degree of $S^b$ on $L_{IC}$.

The foregoing solution enables the classifier to focus on learning the classification knowledge of the novel samples, to increase a value of S″ to reduce $L_{JC}$, so that a classifier with better performance is finally obtained.

Optionally, that the classifier is obtained through training based on a first training sample, a target sample corresponding to the first training sample, and a semantic similarity between the first training sample and the target sample includes: obtaining multi-view features of the first training sample and the target sample; and training the classifier based on the multi-view features.

In the training process, the feature extractor may extract an image feature from an original image, and input the image feature into the classifier for training. Because a quantity of target samples is relatively large, when the feature extractor extracts an image feature of the first training sample after using the target samples to perform extraction and learning, the feature extractor tends to extract the feature from the first training sample based on learned knowledge, and ignores new content in the first training sample. For this reason, this application provides a feature extraction method to convert each sample into a multi-view image (for example, an original image, a foreground image, and a background image), and details of the multi-view image are richer. The feature extractor extracts an image feature from the multi-view image, so that the feature extractor can avoid ignoring the new content in the first training sample and extract a more accurate feature, thereby obtaining a classifier with better performance.

Optionally, the obtaining multi-view features of the first training sample and the target sample includes: separating a plurality of images from each sample in the first training sample and the target sample, where the plurality of images of each sample have different angles of view; obtaining a plurality of features of each sample based on the plurality of images of each sample; and splicing the plurality of features of each sample to obtain the multi-view feature of the target sample.

Optionally, that the classifier is obtained through training based on a first training sample, a target sample corresponding to the first training sample, and a semantic similarity between the first training sample and the target sample includes: determining the predicted score of the first training sample by using the classifier; determining a classification loss function $L_{CE}$ of the classifier based on the predicted score; and training the classifier based on $L_{CE}$.

According to a third aspect, another image classification method is provided, including: obtaining a plurality of images of different angles of view from a to-be-classified image; obtaining a feature of each image in the plurality of images of different angles of view; inputting the feature of each image into a neural network for classification, where the neural network includes a classifier; and obtaining a classification result of the to-be-classified image.

Details of a multi-view image are richer. A feature extractor extracts an image feature from the multi-view image, so that the feature extractor can avoid ignoring new content in the to-be-classified image and extract a more accurate feature, thereby obtaining a more accurate classification result.

Optionally, the plurality of images of different angles of view include the to-be-classified image, a foreground image in the to-be-classified image, or a background image in the to-be-classified image.

Optionally, the inputting the feature of each image into a neural network for classification includes: splicing and then inputting the feature of each image into the neural network for classification.

Optionally, the classifier is obtained through training by using any method according to the first aspect.

According to a fourth aspect, an apparatus for training a classifier is provided, including a unit configured to perform any method in the first aspect.

According to a fifth aspect, an image classification apparatus is provided, including a unit configured to perform any method in the second aspect.

According to a sixth aspect, an image classification apparatus is provided, including a unit configured to perform any method in the third aspect.

According to a seventh aspect, a device for training a classifier is provided, including a processor and a memory. The memory is configured to store a computer program, and the processor is configured to invoke and run the computer program from the memory, so that the device performs any method in the first aspect.

According to an eighth aspect, an image classification device is provided, including a processor and a memory. The memory is configured to store a computer program, and the processor is configured to invoke and run the computer program from the memory, so that the device performs any method in the second aspect.

According to a ninth aspect, an image classification device is provided, including a processor and a memory. The memory is configured to store a computer program, and the processor is configured to invoke and run the computer program from the memory, so that the device performs any method in the third aspect.

According to a tenth aspect, a computer program product is provided. The computer program product includes computer program code. When the computer program code is run by an apparatus for training a classifier, the apparatus is enabled to perform any method in the first aspect.

According to an eleventh aspect, a computer program product is provided. The computer program product includes computer program code. When the computer program code run by a classification apparatus, the apparatus is enabled to perform any method in the second aspect.

According to a twelfth aspect, a computer program product is provided. The computer program product includes computer program code. When the computer program code is run by a classification apparatus, the apparatus is enabled to perform any method in the third aspect.

According to a thirteenth aspect, a computer-readable medium is provided. The computer-readable medium stores program code, and the program code includes instructions used to perform any method in the first aspect.

According to a fourteenth aspect, a computer-readable medium is provided. The computer-readable medium stores program code, and the program code includes instructions used to perform any method in the second aspect.

According to a fifteenth aspect, a computer-readable medium is provided. The computer-readable medium stores program code, and the program code includes instructions used to perform any method in the third aspect.

BRIEF DESCRIPTION OF DRAWINGS

FIG. 1 is a schematic diagram of a neural network according to this application;

FIG. 2 is a schematic diagram of a method for training a classifier according to this application;

DESCRIPTION OF EMBODIMENTS

Figure 3:
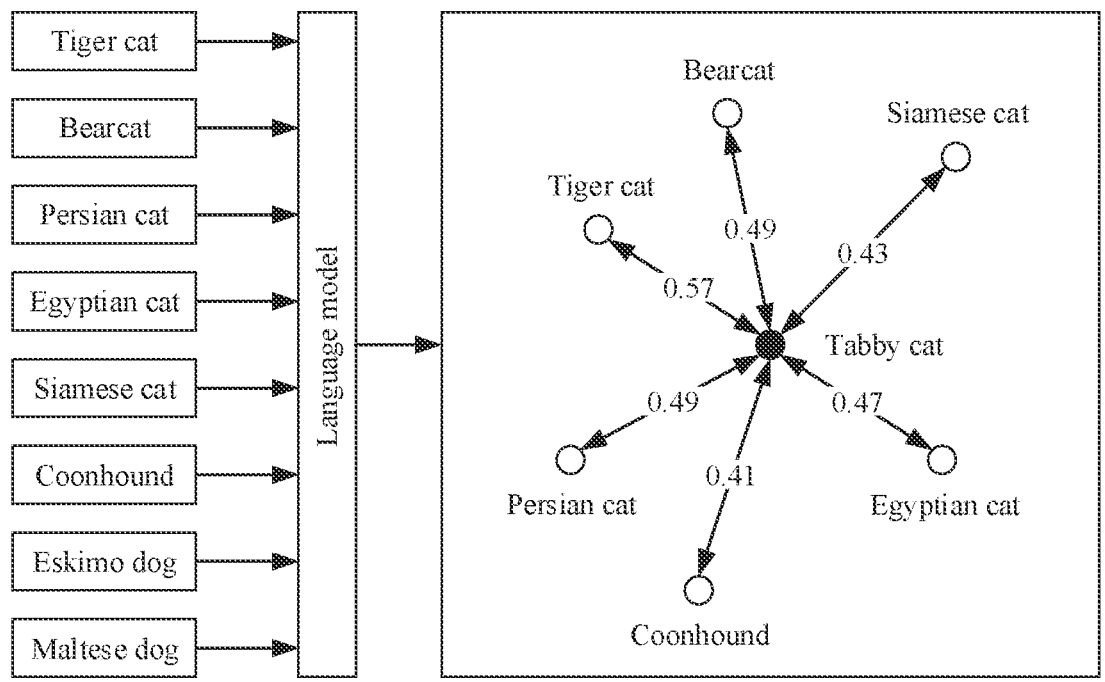
FIG. 3 is a schematic diagram of determining a target sample based on a semantic tag according to this application.

For ease of understanding of technical solutions of this application, concepts in this application are first briefly described.

An artificial neural network (artificial neural network, ANN) is referred to as a neural network (neural network, NN) or a quasi-neural network for short. In the machine learning and cognitive science fields, the artificial neural network is a mathematical model or a computing model that simulates a structure and a function of a biological neural network (a central nervous system of an animal, especially a brain), and is used to estimate or approximate a function. The artificial neural network may include neural networks such as a convolutional neural network (convolutional neural network, CNN), a deep neural network (deep neural network, DNN), and a multilayer perceptron (multilayer perceptron, MLP).

FIG. 1 is a schematic diagram of a neural network according to this application. The neural network 100 includes a multi-view image extractor 110, a feature extractor 120, and a classifier 130.

In a training phase, a training image with a semantic tag is input into the multi-view image extractor 110, and the multi-view image extractor 110 converts the training image into a plurality of images of different angles of view, such as a foreground image and a background image. The multi-view image extractor 110 may convert the training image into the foreground image and the background image by using a salience detection network and a multi-view classifier. In this application, a specific working manner of the multi-view image extractor 110 is not limited, and specific angles of view of a multi-view image are not limited either. In the foregoing processing process, the multi-view image extractor 110 may train the multi-view classifier to improve multi-view classification performance.

After obtaining the plurality of images of different angles of view, the feature extractor 120 separately extracts image features from the plurality of images of different angles of view. The plurality of images of different angles of view obtained by the feature extractor 120 belong to one image. For example, the plurality of images of different angles of view may include an original image of the image, a foreground image of the image, and a background image of the image. Therefore, the feature extractor 120 may learn more knowledge. The feature extractor 120 may splice and then input the image features into the classifier 130, or may separately input the image features into the classifier 130.

The classifier 130 is configured to: determine, based on the image features, a category to which the training image belongs; then determine a loss function based on a classification result and the semantic tag of the training image; and perform training based on the loss function.

After training of the neural network 100 is completed, the neural network 100 may be applied to image classification. An image classification process is similar to the training process. After being input into the multi-view image extractor 110, a to-be-classified image is converted into a plurality of images of different angles of view. The feature extractor 120 extracts an image feature of each image in the plurality of images of different angles of view, and then inputs the image feature of each image into the classifier 130. For example, the image feature of each image may be spliced to form a multi-view feature, and the multi-view feature is input into the classifier 130. The classifier 130 determines, based on the input image feature, a category to which the to-be-classified image belongs, that is, determines a semantic tag of the to-be-classified image.

The following describes a method for training a classifier provided in this application.

As shown in FIG. 2, the method 200 may be performed by a processor, and the method 200 includes the following steps.

S210: Obtain a first training sample, where the first training sample includes a corresponding semantic tag.

S220: Obtain a plurality of second training samples, where each of the second training samples includes a corresponding semantic tag.

The first training sample is, for example, a novel sample, and the second training sample is, for example, a base sample. Both the first training sample and the plurality of second training samples are images that carry semantic tags. After obtaining the first training sample and the plurality of second training samples, the processor may perform the following step.

S230: Determine a target sample from the plurality of second training samples based on semantic similarities between the first training sample and the plurality of second training samples.

Semantic tags describe a similarity between training samples to some extent. Therefore, the similarity between the training samples may be determined by using the semantic tags carried in the training samples.

FIG. 3 shows an example of determining a similarity between training samples based on semantic tags.

A semantic tag of a first training sample is a tabby cat (tabby cat), and semantic tags of eight second training samples are respectively a tiger cat (tiger cat), a bearcat (bear cat), a Persian cat (Persian cat), an Egyptian cat (Egyptian cat), a Siamese cat (Siamese cat), a coonhound (coonhound), an Eskimo dog (Eskimo dog), and a Maltese dog (Maltese dog). A pre-trained language model may be used to convert these semantic tags into feature vectors, and calculate a cosine similarity between a feature vector of the tabby cat and each of feature vectors of the other eight semantic tags. A higher cosine similarity indicates a higher similarity between semantic tags. Results are shown by numerals in FIG. 3. Cosine similarities between feature vectors of the Eskimo dog and the Maltese dog and the feature vector of the tabby cat are extremely low. It is difficult for a classifier to transfer classification knowledge learned from an Eskimo dog image and a Maltese dog image to a classification process of a tabby cat image. Therefore, the two training samples may be discarded, and the other six training samples may be determined as target training samples. The classification knowledge is, for example, a weight or a connection relationship between neurons.

After determining the similarities and the target sample, the processor may perform the following step.

S240: Train a classifier based on the first training sample, the target sample, and a semantic similarity between the first training sample and the target sample.

The semantic similarity is used to measure a difficulty level of knowledge transfer. For example, a semantic similarity between the tabby cat and the tiger cat is high, indicating that a feature similarity between a tabby cat image and a tiger cat image is high. Classification knowledge learned by the classifier from a feature of the tiger cat image is more easily transferred to a classification process of the tabby cat image, and more tiger cat images may be used to train the classifier. A semantic similarity between the tabby cat and the coonhound is low, indicating that a feature similarity between the tabby cat image and a coonhound image is low. Classification knowledge learned by the classifier from a feature of the coonhound image is difficult to transfer to the classification process of the tabby cat image, and a quantity of coonhound images used in a training process of the classifier may be reduced. Therefore, training efficiency and performance of the classifier can be improved by training the classifier based on the semantic similarity. In addition, during feature extraction in the foregoing method, a semantic tag is not used for learning. Therefore, a network structure of a feature extractor does not need to be changed, thereby improving training efficiency of a neural network (for example, the neural network 100).

In the training process, the feature extractor may extract an image feature from an original image, and input the image feature into the classifier for training. Because a quantity of target samples is relatively large, when the feature extractor extracts an image feature of the first training sample after using the target samples to perform extraction and learning, the feature extractor tends to extract the feature from the first training sample based on learned knowledge, and ignores new content in the first training sample. For this reason, this application provides a feature extraction method to convert each sample into a multi-view image (for example, a foreground image and a background image), and details of the multi-view image are richer. The feature extractor extracts an image feature from the multi-view image, so that the feature extractor can avoid ignoring the new content in the first training sample and extract a more accurate feature, thereby obtaining a classifier with better performance.

Optionally, in the training process of the classifier, the processor may determine a predicted score of the first training sample by using the classifier, then determine a semantic transfer loss function $L_{semantic}$ of the classifier based on the predicted score and the semantic similarity between the first training sample and the target sample, and then train the classifier based on $L_{semantic}$.

The semantic similarity between the target sample and the first training sample is used to determine an influence degree of the predicted score on $L_{semantic}$. A higher semantic similarity leads to a greater influence degree, and a lower semantic similarity leads to a smaller influence degree. That is, the semantic similarity is positively correlated with the influence degree.

A semantic transfer intensity may be set. When the semantic similarity between the target sample and the first training sample is greater than or equal to the semantic transfer intensity, the influence degree of the predicted score on $L_{semantic}$ is 100%. When the semantic similarity between the target sample and the first training sample is less than the semantic transfer intensity, the influence degree of the predicted score on $L_{semantic}$ is 0.

$L_{semantic}$ may be determined based on a formula (1).

$$L_{semantic} = -\frac{1}{|C_{base}|} \sum_{j \in base} \gamma \log s_j, \gamma = \begin{cases} 1, & \text{if } l_j \geq \alpha \\ 0, & \text{if } l_j < \alpha \end{cases} \quad (1)$$

Herein, $C_{base}$ represents a quantity of categories of target samples; base represents one class of target sample; $s_j$ is a score of the first training sample classified by using knowledge of a training sample j, and $s_j \in R^{C_{base}+C_{novel}}$, where R represents a real number, and $C_{novel}$ represents a quantity of categories of novel samples; $I_j$ is a semantic similarity between the training sample j and the first training sample, and $I_j \in R^{C_{base}}$; and $\alpha$ is the semantic transfer intensity.

When $I_j \geq \alpha$, it indicates that the semantic similarity between the training sample j and the first training sample is relatively high, and $S_j$ may be used as a factor affecting $L_{semantic}$, so that the classifier learns correct classification knowledge. When $I_j < \alpha$, it indicates that the semantic similarity between the training sample j and the first training sample is relatively low, and influence of $s_j$ on $L_{semantic}$ may not need to be considered, so that the classifier avoids being misled by wrong classification knowledge.

It may be learned from the foregoing that the performance of the classifier can be improved by training the classifier based on the semantic similarity.

In the training process of the classifier, a quantity of base samples is generally greater than a quantity of novel samples, and the classifier tends to predict the novel samples into categories of the base samples based on knowledge learned from the base samples, resulting in performance degradation of the classifier.

Optionally, a balanced learning loss function $L_{IC}$ may be used in the training process of the classifier to resolve this problem. When a predicted score of the first training sample determined by the classifier is $S^n$, and a predicted score of the target training sample is $S^b$, the processor may determine $L_{IC}$ based on $S^n$, $S^b$, and a balanced learning intensity, and then train the classifier based on $L_{IC}$.

$L_{IC}$ may be determined based on a formula (2).

$$L_{IC} = \max\left(\frac{\langle s^b, s^n \rangle}{\|s^b\| \cdot \|s^n\|} + \beta, 0\right) \quad (2)$$

Herein, $s^b \in R^{C_{base}+C_{novel}}$, and $s^b$ is a real number (a score of a single sample) or a vector (scores of a plurality of samples); $s^n \in R^{C_{base}+C_{novel}}$, and $s^n$ is a real number (a score of a single sample) or a vector (scores of a plurality of samples); $\langle s^b, s^n \rangle$ represents a product of $s^b$ and $s^n$; $\|s^b\|$ represents an absolute value of a real number $s^b$ or a modulus of a vector $s^b$; $\|s^n\|$ represents an absolute value of a real number $s^n$ or a modulus of a vector $s^n$; and $\beta$ represents the balanced learning intensity.

The balanced learning intensity is used to adjust influence degrees of $S^n$ and $S^b$ on $L_{IC}$. For example, the balanced learning intensity is used to increase the influence degree of $S^n$ on $L_{IC}$, and decrease the influence degree of $S^b$ on $L_{IC}$. In this way, the classifier needs to focus more on learning classification knowledge of the novel samples, to increase a value of $S^n$ to reduce $L_{IC}$, so that a classifier with better performance is finally obtained.

In addition to $L_{semantic}$ and $L_{IC}$, the processor may further determine a classification loss function $L_{CE}$ of the classifier based on a predicted score for classifying the novel sample, and train the classifier based on $L_{CE}$. For example, the processor may complete training of the classifier by minimizing $L_{semantic}+L_{IC}+L_{CE}$.

The following provides several examples of beneficial effects of this application.

Table 1 is a comparison between test results of a classifier trained with $L_{CE}$ and $L_{IC}$ and a classifier trained only with $L_{CE}$.

TABLE 1

| | Method | K = 1 | K = 2 | K = 5 | K = 10 | K = 20 |
|---|---|---|---|---|---|---|
| NOVEL-$S_1$ | $L_{CE}$ and $L_{IC}$ | 50.1 | 62.0 | 73.4 | 78.1 | 80.7 |
| | $L_{CE}$ | 49.5 | 61.8 | 72.9 | 77.3 | 79.8 |
| ALL-$S_1$ | $L_{CE}$ and $L_{IC}$ | 60.1 | 68.5 | 75.9 | 78.6 | 79.9 |
| | $L_{CE}$ | 59.7 | 68.2 | 75.6 | 78.3 | 79.3 |

It may be learned from Table 1 that a predicted score of the classifier trained with $L_{CE}$ and $L_{IC}$ is generally higher than a predicted score of the classifier trained only with $L_{CE}$.

Table 2 is a test result of the method 200 on an open large-scale few-shot dataset.

TABLE 2

| | Novel | | | | | ALL | | | | |
|---|---|---|---|---|---|---|---|---|---|---|
| ImageNet-FS | K = 1 | K = 2 | K = 5 | K = 10 | K = 20 | K = 1 | K = 2 | K = 5 | K = 10 | K = 20 |
| PN[NeurIPS 2017] | 39.3 | 54.4 | 66.3 | 71.2 | 73.9 | 49.5 | 61.0 | 69.7 | 72.9 | 74.6 |
| MN[NeurIPS 2016] | 43.6 | 54.0 | 66.0 | 72.5 | 76.9 | 54.4 | 61.0 | 69.0 | 73.7 | 76.5 |
| LR(H)[ICCV 2017] | 40.7 | 50.8 | 62.0 | 69.3 | 76.5 | 52.2 | 59.4 | 67.6 | 72.8 | 76.9 |
| SGM(H)[ICCV 2017] | 44.3 | 56.0 | 69.7 | 75.3 | 78.6 | 54.8 | 62.6 | 71.6 | 76.0 | 78.2 |
| PMN(H)[ICCV 2017] | 45.8 | 57.8 | 69.0 | 74.3 | 77.4 | 57.6 | 64.7 | 71.9 | 75.2 | 77.5 |
| LwoF[CVPR 2018] | 46.2 | 57.5 | 69.2 | 74.8 | 78.1 | 58.2 | 65.2 | 72.7 | 76.5 | 78.7 |
| wDAE-GNN[CVPR 2019] | 48.0 | 59.7 | 70.3 | 75.0 | 77.8 | 59.1 | 66.3 | 73.2 | 76.1 | 77.5 |
| Method 200 | 51.8 | 63.1 | 73.6 | 78.1 | 80.9 | 60.1 | 68.5 | 75.9 | 78.9 | 80.5 |

It may be learned from Table 2 that a gain of the method 200 is greatly improved compared with other methods.

Table 3 is an effect of the method 200 combined with an existing large-scale few-shot recognition method.

TABLE 3

| | Novel | | | | |
|---|---|---|---|---|---|
| ImNet | K = 1 | K = 2 | K = 5 | K = 10 | K = 20 |
| SGM[ICCV 2017] | 31.4 | 42.7 | 49.1 | 53.2. | 56.4 |
| SGM + Method 200 | 33.5 | 44.1 | 50.1 | 54.5 | 57.3 |
| KTCH[CVPR 2019] | 36.0 | 47.0 | 52.9 | 57.2 | 60.4 |
| KTCH + Method 200 | 40.1 | 50.5 | 56.6 | 60.8 | 63.3 |

It may be learned from Table 3 that accuracy is improved after the method 200 is combined with the existing large-scale few-shot recognition method.

The method 200 may be applied to a conventional few-shot recognition task, in addition to a large-scale few-shot recognition task. A specific experimental result is shown in Table 4.

TABLE 4

| MiniImageNet | Feature Extractor | K = 1 | K = 5 |
|---|---|---|---|
| RelationNet [CVPR 2018] | Conv-4-64 | 50.40 ± 0.80% | 65.30 ± 0.70% |
| MetaGAN [NeurIPS 2018] | Conv-4-64 | 52.71 ± 0.64% | 68.63 ± 0.67% |
| R2-D2 [ICLR 2019] | Conv-4-64 | 48.70 ± 0.60% | 65.50 ± 0.60% |
| DN4 [CVPR2019] | Conv-4-64 | 51.24 ± 0.74% | 71.02 ± 0.64% |
| MetaNet [ICML 2017] | ResNets-12 | 57.10 ± 0.70% | 70.04 ± 0.63% |
| TADAM [NeurIPS 2018] | ResNets-12 | 58.05 ± 0.30% | 76.70 ± 0.30% |
| MTL [CVPR2019] | ResNets-12 | 61.20 ± 1.20% | 75.50 ± 0.80% |
| PPA [CVPR2018] | WRN-28-10 | 59.60 ± 0.41% | 73.74 ± 0.19% |
| LEO [ICLR 2019] | WRN-28-10 | 61.76 ± 0.08% | 77.59 ± 0.12% |
| LwoF [CVPR2018] | WRN-28-10 | 60.06 ± 0.14% | 76.39 ± 0.11% |
| wDAE-GNN[CVPR 2019] | WRN-28-10 | 62.96 ± 0.15% | 78.85 ± 0.10% |
| Method 200 | WRN-28-10 | 64.40 ± 0.43% | 83.05 ± 0.28% |

The foregoing describes in detail examples of the method for training a classifier and the image classification method that are provided in this application. It may be understood that, to implement the foregoing functions, a corresponding apparatus includes a corresponding hardware structure and/or software module for performing each function. A person skilled in the art should be easily aware that, in combination with examples of units and algorithm steps described in embodiments disclosed in this specification, this application can be implemented by using hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In this application, function unit division may be performed on the apparatus for training a classifier and the image classification apparatus based on the foregoing method examples. For example, each function unit may be obtained through division for each function, or two or more functions may be integrated into one unit. The integrated unit may be implemented in a form of hardware, or may be implemented in a form of a software function unit. It should be noted that, in this application, division into the units is an example, and is merely logical function division. During actual implementation, another division manner may be used.

Figure 4:
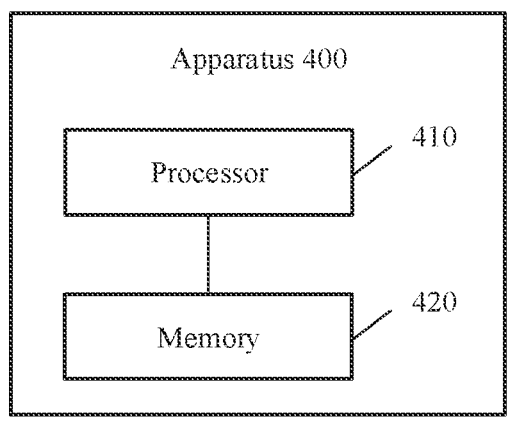
FIG. 4 is a schematic diagram of an apparatus for training a classifier according to this application.

FIG. 4 is a schematic diagram of a structure of an apparatus for training a classifier according to this application. The apparatus 400 includes a processor 410 and a storage unit 420. The memory 420 is configured to store a computer program. The processor 410 is configured to invoke and run the computer program from the memory 420 to: obtain a first training sample, where the first training sample includes a corresponding semantic tag; obtain a plurality of second training samples, where each of the second training samples includes a corresponding semantic tag; determine a target sample from the plurality of second training samples based on semantic similarities between the first training sample and the plurality of second training samples; and train a classifier based on the first training sample, the target sample, and a semantic similarity between the first training sample and the target sample.

Optionally, the processor 410 is specifically configured to: determine a predicted score of the first training sample by using the classifier; determine a semantic transfer loss function $L_{semantic}$ of the classifier based on the predicted score and the semantic similarity between the first training sample and the target sample, where the semantic similarity between the target sample and the first training sample is used to determine an influence degree of the predicted score on $L_{semantic}$; and train the classifier based on $L_{semantic}$.

Optionally, when the semantic similarity between the target sample and the first training sample is greater than or equal to a semantic transfer intensity, the influence degree of the predicted score on $L_{semantic}$ is 100%. Alternatively, when the semantic similarity between the target sample and the first training sample is less than the semantic transfer intensity, the influence degree of the predicted score on $L_{semantic}$ is 0.

Optionally, the processor 410 is specifically configured to: determine a predicted score $S^n$ of the first training sample by using the classifier; determine a predicted score $S^b$ of the target training sample by using the classifier; determine a balanced learning loss function $L_{IC}$ of the classifier based on $S^n$, $S^b$, and a balanced learning intensity, where the balanced learning intensity is used to adjust influence degrees of $S^n$ and $S^b$ on $L_{IC}$; and train the classifier based on $L_{IC}$.

Optionally, the processor 410 is configured to: use the balanced learning intensity to increase an influence degree of $S^n$ on $L_{IC}$, and decrease an influence degree of $S^b$ on $L_{IC}$.

Optionally, the processor 410 is specifically configured to: obtain multi-view features of the first training sample and the target sample; and train the classifier based on the multi-view features.

Optionally, the processor 410 is specifically configured to: separate a plurality of images from each sample in the first training sample and the target sample, where the plurality of images have different angles of view; obtain a plurality of features of each sample in the first training sample and the target sample based on the plurality of images; and splice the plurality of features to obtain the multi-view features.

Optionally, the processor 410 is specifically configured to: determine a predicted score of the first training sample by using the classifier; determine a classification loss function $L_{CE}$ of the classifier based on the predicted score; and train the classifier based on $L_{CE}$.

For a specific manner in which the apparatus 400 performs the method for training a classifier and a generated beneficial effect, refer to related descriptions in the method embodiments.

Figure 5:
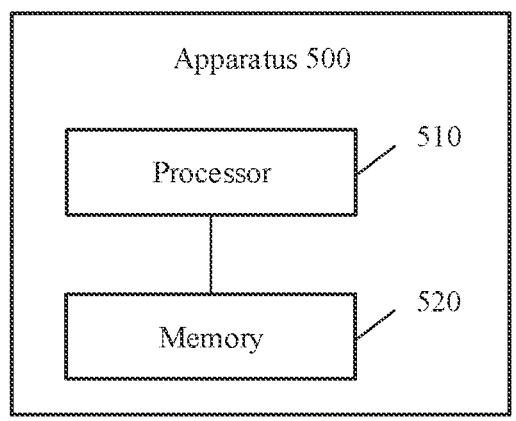
FIG. 5 is a schematic diagram of an image classification apparatus according to this application.

FIG. 5 is a schematic diagram of a structure of an image classification apparatus according to this application. The apparatus 500 includes a processor 510 and a memory 520. The memory 520 is configured to store a computer program, and the processor 510 is configured to invoke and run the computer program from the memory 520 to: obtain a feature of a to-be-classified image; input the feature into a neural network for classification, where the neural network includes a classifier, the classifier is obtained through training by using the method 200; and obtain a classification result of the to-be-classified image.

Optionally, the feature of the predicted image is a multi-view feature.

Optionally, the processor 510 is specifically configured to: obtain a plurality of images of different angles of view from the to-be-classified image; obtain a feature of each image in the plurality of images of different angles of view; and splice the feature of each image to obtain the multi-view feature of the to-be-classified image.

For a specific manner in which the apparatus 500 performs the image classification method and a generated beneficial effect, refer to related descriptions in the method embodiments.

Optionally, the apparatus 500 and the apparatus 400 are a same apparatus.

Figure 6:
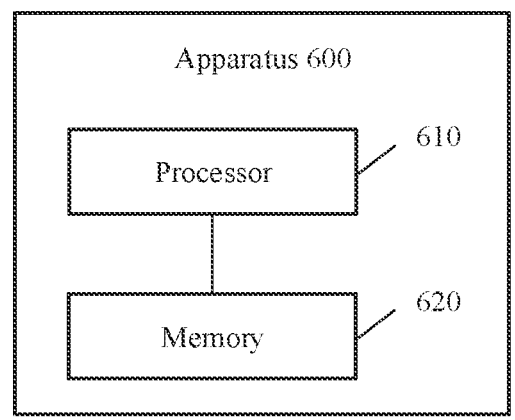
FIG. 6 is a schematic diagram of another image classification apparatus according to this application.

FIG. 6 is a schematic diagram of a structure of another image classification apparatus according to this application. The apparatus 600 includes a processor 610 and a memory 620. The memory 620 is configured to store a computer program, and the processor 610 is configured to invoke and run the computer program from the memory 620 to: obtain a plurality of images of different angles of view from a to-be-classified image; obtain a feature of each image in the plurality of images of different angles of view; input the feature of each image into a neural network for classification, where the neural network includes a classifier; and obtain a classification result of the to-be-classified image.

Optionally, the plurality of images of different angles of view include at least two of the to-be-classified image, a foreground image in the to-be-classified image, or a background image in the to-be-classified image.

Optionally, the inputting the feature of each image into a neural network for classification includes: splicing and then inputting the feature of each image into the neural network for classification.

Optionally, the classifier is obtained through training by using the method 200.

For a specific manner in which the apparatus 600 performs the image classification method and a generated beneficial effect, refer to related descriptions in the method embodiments.

Optionally, the apparatus 600 and the apparatus 400 are a same apparatus.

Figure 7:
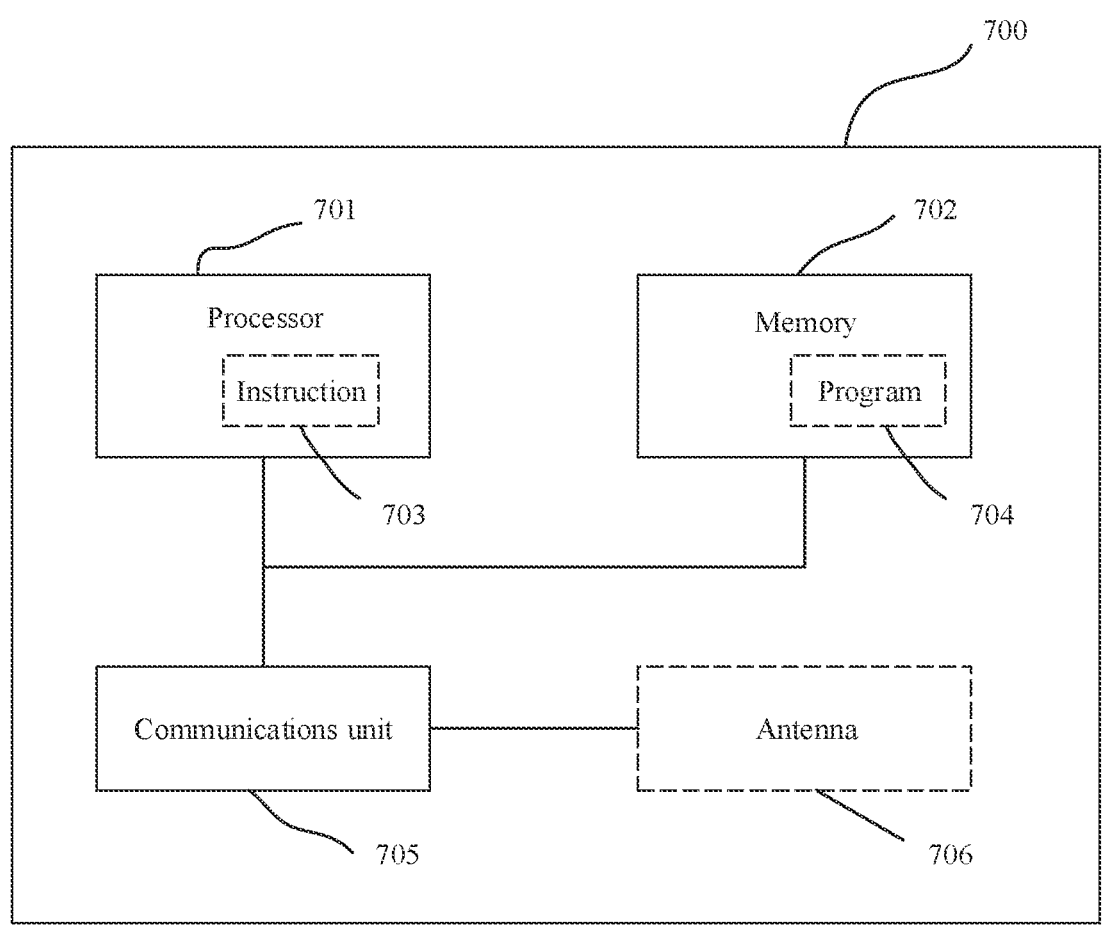
FIG. 7 is a schematic diagram of an electronic device according to this application.

FIG. 7 shows a schematic diagram of a structure of an electronic device according to this application. A dashed line in FIG. 7 indicates that the unit or the module is optional. The device 700 may be configured to implement the methods described in the foregoing method embodiments. The device 700 may be a terminal device, a server, or a chip.

The device 700 includes one or more processors 701, and the one or more processors 701 may support the device 700 in implementing the methods in the method embodiments. The processor 701 may be a general-purpose processor or a dedicated processor. For example, the processor 701 may be a central processing unit (central processing unit, CPU). The CPU may be configured to control the device 700, execute a software program, and process data of the software program. The device 700 may further include a communications unit 705, configured to implement input (receiving) and output (sending) of a signal.

For example, the device 700 may be a chip. The communications unit 705 may be an input circuit and/or an output circuit of the chip, or the communications unit 705 may be a communications interface of the chip. The chip may be used as a component of a terminal device, a network device, or another electronic device.

For another example, the device 700 may be a terminal device or a server. The communications unit 705 may be a transceiver of the terminal device or the server, or the communications unit 705 may be a transceiver circuit of the terminal device or the server.

The device 700 may include one or more memories 702, and the memory 702 stores a program 704. The program 704 may be run by the processor 701 to generate instructions 703, so that the processor 701 performs, based on the instructions 703, the methods described in the foregoing method embodiments. Optionally, the memory 702 may further store data. Optionally, the processor 701 may further read the data stored in the memory 702. The data may be stored at a same storage address as the program 704, or the data may be stored at a different storage address from the program 704.

The processor 701 and the memory 702 may be separately disposed, or may be integrated together, for example, integrated on a system on chip (system on chip, SOC) of the terminal device.

The device 700 may further include an antenna 706. The communications unit 705 is configured to implement a transceiver function of the device 700 by using the antenna 706.

For specific manners in which the processor 701 performs the method for training a classifier and the image classification method, refer to related descriptions in the method embodiments.

It should be understood that the steps in the foregoing method embodiments may be completed by using a logic circuit in a form of hardware or instructions in a form of software in the processor 701. The processor 701 may be a CPU, a digital signal processor (digital signal processor, DSP), an application-specific integrated circuit (application-specific integrated circuit, ASIC), a field programmable gate array (field programmable gate array, FPGA), or another programmable logic device, for example, a discrete gate, a transistor logic device, or a discrete hardware component.

This application further provides a computer program product. When the computer program product is executed by the processor 701, the method according to any method embodiment of this application is implemented.

The computer program product such as the program 704 may be stored in the memory 702. After being preprocessed, compiled, assembled, linked, and the like, the program 704 is finally converted into an executable target file that can be executed by the processor 701.

This application further provides a computer-readable storage medium, which stores a computer program. When the computer program is executed by a computer, the method according to any method embodiment of this application is implemented. The computer program may be a high-level language program, or may be an executable target program.

The computer-readable storage medium is, for example, the memory 702. The memory 702 may be a volatile memory or a non-volatile memory, or the memory 702 may include both a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It may be clearly understood by a person skilled in the art that, for ease and brevity of description, for a specific working process and a generated technical effect of the foregoing apparatus and device, refer to a corresponding process and technical effect in the foregoing method embodiments, and details are not described herein again.

In the several embodiments provided in this application, the disclosed systems, apparatuses and methods may be implemented in other manners. For example, some features of the method embodiments described above may be ignored or not performed. The described apparatus embodiments are merely examples. Division into the units is merely logical function division and may be other division in actual implementation. A plurality of units or components may be combined or integrated into another system. In addition, coupling between the units or coupling between the components may be direct coupling or indirect coupling, and the coupling may include an electrical connection, a mechanical connection, or another form of connection.

It should be understood that sequence numbers of the processes do not mean an execution sequence in embodiments of this application. The execution sequence of the processes should be determined based on functions and internal logic of the processes, and should not be constituted as any limitation on the implementation processes of embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A method for training a classifier, comprising:
obtaining, by an electronic device, a first training sample, wherein the first training sample comprises a corresponding semantic tag;
obtaining, by the electronic device, a plurality of second training samples, wherein each of the second training samples comprises a corresponding semantic tag;
determining, by the electronic device, a target sample from the plurality of second training samples based on semantic similarities between the first training sample and the plurality of second training samples; and
training, by the electronic device, a classifier based on the first training sample, the target sample, and a semantic similarity between the first training sample and the target sample, wherein the classifier is used in an image classification operation, and wherein the training the classifier based on the first training sample, the target sample, and the semantic similarity between the first training sample and the target sample comprises:

obtaining multi-view features of the first training sample and the target sample; and training the classifier based on the multi-view features.

2. The method according to claim 1, wherein the training the classifier based on the first training sample, the target sample, and a semantic similarity between the first training sample and the target sample comprises:

determining a predicted score of the first training sample by using the classifier;

determining a semantic transfer loss function $L_{semantic}$ of the classifier based on the predicted score and the semantic similarity between the first training sample and the target sample, wherein the semantic similarity between the target sample and the first training sample is used to determine an influence degree of the predicted score on $L_{semantic}$; and training the classifier based on $L_{semantic}$.

3. The method according to claim 2, wherein when the semantic similarity between the target sample and the first training sample is greater than or equal to a semantic transfer intensity, the influence degree of the predicted score on $L_{semantic}$ is 100%; or when the semantic similarity between the target sample and the first training sample is less than the semantic transfer intensity, the influence degree of the predicted score on $L_{semantic}$ is 0.

4. The method according to claim 1, wherein the training the classifier based on the first training sample, the target sample, and a semantic similarity between the first training sample and the target sample comprises:

determining a predicted score $S^n$ of the first training sample by using the classifier;

determining a predicted score $S^b$ of the target sample by using the classifier;

determining a balanced learning loss function $L_{IC}$ of the classifier based on $S^n$, $S^b$, and a balanced learning intensity, wherein the balanced learning intensity is used to adjust influence degrees of $S^n$ and $S^b$ on $L_{IC}$; and training the classifier based on $L_{IC}$.

5. The method according to claim 4, wherein that the balanced learning intensity is used to adjust influence degrees of $S^n$ and $S^b$ on $L_{IC}$ comprises:

the balanced learning intensity is used to increase the influence degree of $S^n$ on $L_{IC}$, and decrease the influence degree of $S^b$ on $L_{IC}$.

6. The method according to claim 1, wherein the obtaining multi-view features of the first training sample and the target sample comprises:

separating a plurality of images from each sample in the first training sample and the target sample, wherein the plurality of images of each sample have different angles of view;

obtaining a plurality of features of each sample based on the plurality of images of each sample; and splicing the plurality of features of each sample to obtain the multi-view features.

7. The method according to claim 1, wherein the training the classifier based on the first training sample, the target sample, and a semantic similarity between the first training sample and the target sample comprises:

determining a predicted score of the first training sample by using the classifier;

determining a classification loss function $L_{CE}$ of the classifier based on the predicted score; and training the classifier based on $L_{CE}$.

8. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

obtaining a first training sample, wherein the first training sample comprises a corresponding semantic tag;

obtaining a plurality of second training samples, wherein each of the second training samples comprises a corresponding semantic tag;

determining a target sample from the plurality of second training samples based on semantic similarities between the first training sample and the plurality of second training samples; and training a classifier based on the first training sample, the target sample, and a semantic similarity between the first training sample and the target sample, wherein the classifier is used in an image classification operation, and wherein the training the classifier based on the first training sample, the target sample, and the semantic similarity between the first training sample and the target sample comprises:

obtaining multi-view features of the first training sample and the target sample; and training the classifier based on the multi-view features.

9. The apparatus according to claim 8, wherein the training the classifier based on the first training sample, the target sample, and a semantic similarity between the first training sample and the target sample comprises:

determining a predicted score of the first training sample by using the classifier;

determining a semantic transfer loss function $L_{semantic}$ of the classifier based on the predicted score and the semantic similarity between the first training sample and the target sample, wherein the semantic similarity between the target sample and the first training sample is used to determine an influence degree of the predicted score on $L_{semantic}$; and training the classifier based on $L_{semantic}$.

10. The apparatus according to claim 9, wherein when the semantic similarity between the target sample and the first training sample is greater than or equal to a semantic transfer intensity, the influence degree of the predicted score on $L_{semantic}$ is 100%; or when the semantic similarity between the target sample and the first training sample is less than the semantic transfer intensity, the influence degree of the predicted score on $L_{semantic}$ is 0.

11. The apparatus according to claim 8, wherein the training the classifier based on the first training sample, the target sample, and a semantic similarity between the first training sample and the target sample comprises:

determining a predicted score $S^n$ of the first training sample by using the classifier;

determining a predicted score $S^b$ of the target sample by using the classifier;

determining a balanced learning loss function $L_{IC}$ of the classifier based on $S^n$, $S^b$, and a balanced learning intensity, wherein the balanced learning intensity is used to adjust influence degrees of $S^n$ and $S^b$ on $L_{IC}$; and training the classifier based on $L_{IC}$.

12. The apparatus according to claim 11, wherein that the balanced learning intensity is used to adjust influence degrees of $S^n$ and $S^b$ on $L_{IC}$ comprises:

the balanced learning intensity is used to increase the influence degree of $S^n$ on $L_{IC}$, and decrease the influence degree of $S^b$ on $L_{IC}$.

13. The apparatus according to claim 8, wherein the obtaining multi-view features of the first training sample and the target sample comprises:
   separating a plurality of images from each sample in the first training sample and the target sample, wherein the plurality of images of each sample have different angles of view;
   obtaining a plurality of features of each sample based on the plurality of images of each sample; and
   splicing the plurality of features of each sample to obtain the multi-view features.

14. The apparatus according to claim 8, wherein the training the classifier based on the first training sample, the target sample, and a semantic similarity between the first training sample and the target sample comprises:
   determining a predicted score of the first training sample by using the classifier;
   determining a classification loss function $L_{CE}$ of the classifier based on the predicted score; and
   training the classifier based on $L_{CE}$.

15. One or more non-transitory computer-readable media storing computer instructions, that when executed by one or more processors, cause a computing device to perform operations comprising:
   obtaining a first training sample, wherein the first training sample comprises a corresponding semantic tag;
   obtaining a plurality of second training samples, wherein each of the second training samples comprises a corresponding semantic tag;
   determining a target sample from the plurality of second training samples based on semantic similarities between the first training sample and the plurality of second training samples; and
   training a classifier based on the first training sample, the target sample, and a semantic similarity between the first training sample and the target sample, wherein the classifier is used in an image classification operation, and wherein the training the classifier based on the first training sample, the target sample, and the semantic similarity between the first training sample and the target sample comprises:
      obtaining multi-view features of the first training sample and the target sample; and
      training the classifier based on the multi-view features.

16. The one or more non-transitory computer-readable media according to claim 15, wherein the training the classifier based on the first training sample, the target sample, and a semantic similarity between the first training sample and the target sample comprises:
   determining a predicted score of the first training sample by using the classifier;
   determining a semantic transfer loss function $L_{semantic}$ of the classifier based on the predicted score and the semantic similarity between the first training sample and the target sample, wherein the semantic similarity between the target sample and the first training sample is used to determine an influence degree of the predicted score on $L_{semantic}$; and
   training the classifier based on $L_{semantic}$.

17. The one or more non-transitory computer-readable media according to claim 16, wherein
   when the semantic similarity between the target sample and the first training sample is greater than or equal to a semantic transfer intensity, the influence degree of the predicted score on $L_{semantic}$ is 100%; or
   when the semantic similarity between the target sample and the first training sample is less than the semantic transfer intensity, the influence degree of the predicted score on $L_{semantic}$ is 0.

18. The one or more non-transitory computer-readable media according to claim 15, wherein the training the classifier based on the first training sample, the target sample, and a semantic similarity between the first training sample and the target sample comprises:
   determining a predicted score $S^n$ of the first training sample by using the classifier;
   determining a predicted score $S^b$ of the target sample by using the classifier;
   determining a balanced learning loss function $L_{IC}$ of the classifier based on $S^n$, $S^b$, and a balanced learning intensity, wherein the balanced learning intensity is used to adjust influence degrees of $S^n$ and $S^b$ on $L_{IC}$; and
   training the classifier based on $L_{IC}$.

19. The one or more non-transitory computer-readable media according to claim 18, wherein that the balanced learning intensity is used to adjust influence degrees of $S^n$ and $S^b$ on $L_{IC}$ comprises:
   the balanced learning intensity is used to increase the influence degree of $S^n$ on $L_{IC}$, and decrease the influence degree of $S^b$ on $L_{IC}$.

20. The one or more non-transitory computer-readable media according to claim 15, wherein the obtaining multi-view features of the first training sample and the target sample comprises:
   separating a plurality of images from each sample in the first training sample and the target sample, wherein the plurality of images of each sample have different angles of view;
   obtaining a plurality of features of each sample based on the plurality of images of each sample; and
   splicing the plurality of features of each sample to obtain the multi-view features.

* * * * *